Dec. 20, 1960 E. D. LEWIS 2,965,292
DIET TABULATOR
Filed Feb. 25, 1958 2 Sheets-Sheet 1
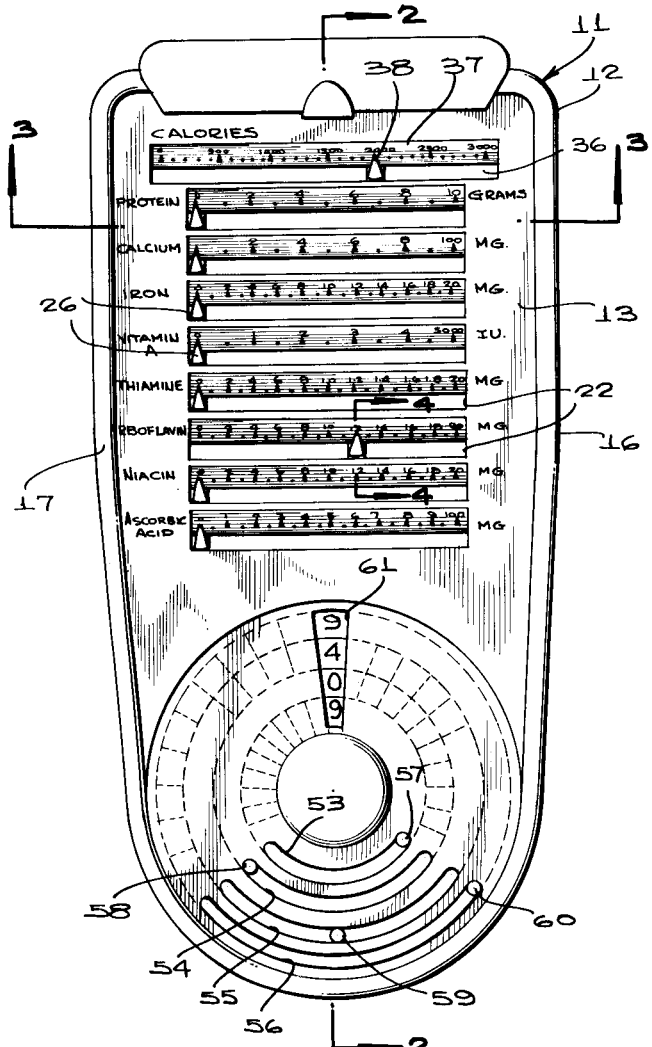
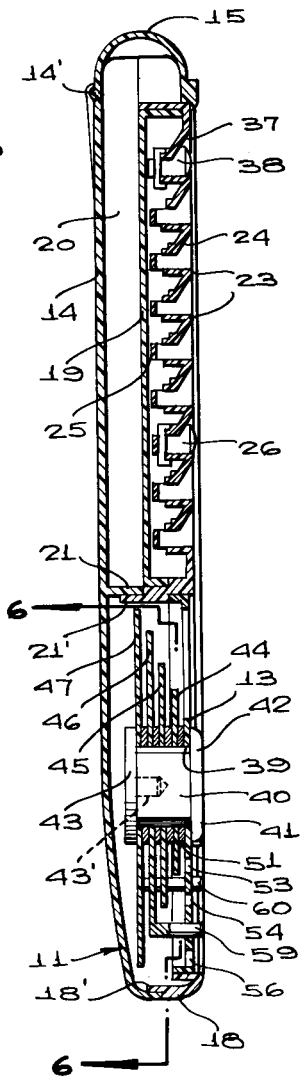
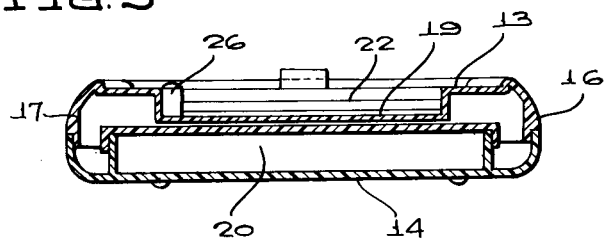
INVENTOR.
EDWARD D. LEWIS
BY
McMorrow, Berman & Davidson
ATTORNEYS Dec. 20, 1960     E. D. LEWIS     2,965,292
DIET TABULATOR
Filed Feb. 25, 1958                                              2 Sheets-Sheet 2
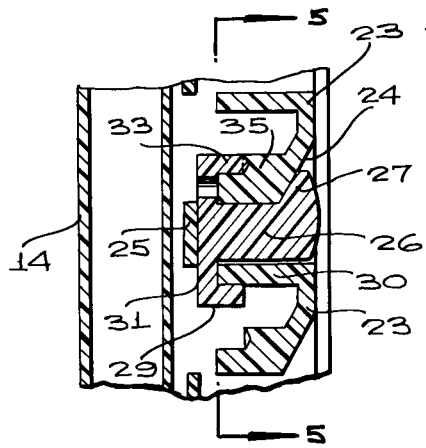
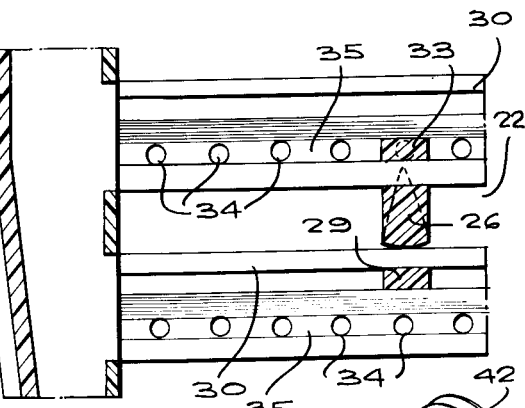
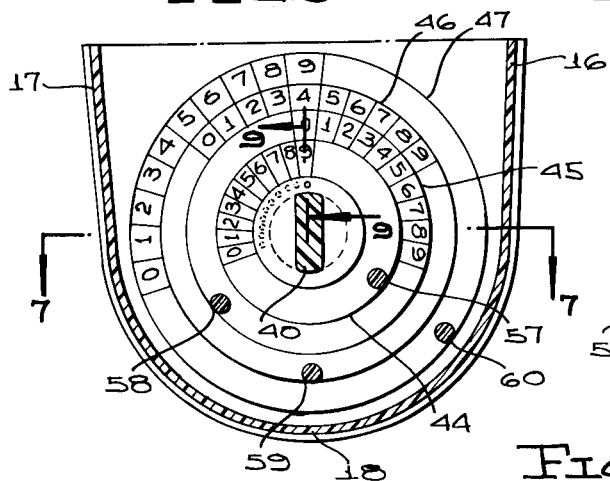
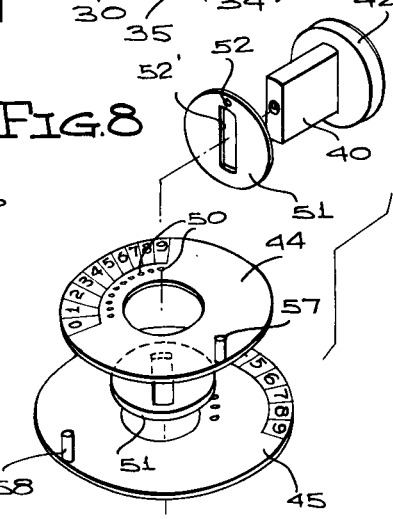
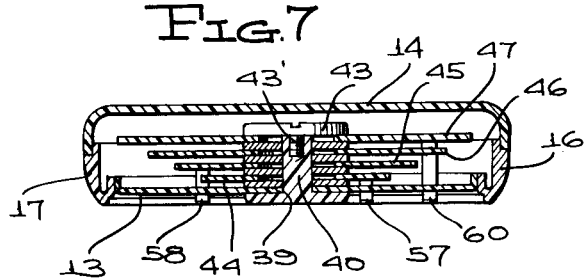
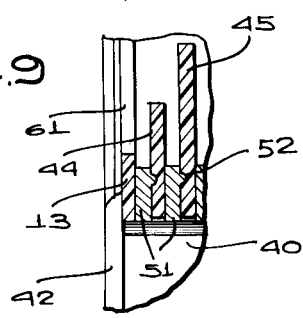
INVENTOR.
EDWARD D. LEWIS
BY
McMorrow, Berman & Davidson
ATTORNEYS

United States Patent Office 2,965,292
Patented Dec. 20, 1960

2,965,292
DIET TABULATOR
Edward D. Lewis, San Francisco, Calif.
(142 N. Marshall St., York, Pa.)

Filed Feb. 25, 1958, Ser. No. 717,383

1 Claim. (Cl. 235—78)

This invention relates to tabulating devices, and more particularly to a portable tabulator for enabling a person to totalize the various ingredients found in food articles consumed.

The main object of the invention is to provide a novel and improved diet tabulator which is simple in construction, which is compact in size and which is easy to operate.

A further object of the invention is to provide an improved diet tabulator which is inexpensive to manufacture, which is durable in construction, and which enables a person using same to quickly and easily totalize the various ingredients in a given food article which he consumes so as to ascertain the total value of the protein, mineral, vitamin, and other specific ingredients contained in the food article, or to tabulate the total number of calories contained in various items consumed at a given meal or over a given period of time, from data carried with the tabulator.

Further objects and advantages of the invention will become apparent from the following description and claim, and from the accompanying drawings, wherein:

Figure 1 is a front elevational view of a diet tabulator constructed in accordance with the present invention.

Figure 2 is a vertical cross sectional view taken on the line 2—2 of Figure 1.

Figure 3 is a horizontal cross sectional view taken on the line 3—3 of Figure 1.

Figure 4 is an enlarged fragmentary cross sectional detail view taken on the line 4—4 of Figure 1.

Figure 5 is a cross sectional detail view taken on the line 5—5 of Figure 4.

Figure 6 is a cross sectional view taken on the line 6—6 of Figure 2.

Figure 7 is a horizontal cross sectional view taken on the line 7—7 of Figure 6.

Figure 8 is a perspective detail view showing certain of the elements of the totalizing portion of the tabulator, the elements being shown in separated position.

Figure 9 is an enlarged cross sectional detail view taken on the line 9—9 of Figure 6.

Referring to the drawings, 11 generally designates a diet tabulator according to the present invention, said tabulator comprising a relatively flat elongated housing 12 of any suitable material, such as molded plastic material, said housing comprising a front wall 13 and a back cover 14, hinged at 14' to the top portion of the housing, the front wall 13 being integrally united with a top wall 15, side wall portions 16 and 17 and a bottom wall 18. The upper portion of the housing is formed with the partition 19 defining a space 20 between the partition wall 19 and the cover 14, said space being adapted to contain suitable cards provided with the statistical information comprising the food ingredient values associated with different specific food articles ordinarily consumed by an individual. Thus, the data cards may contain the unit values of such ingredients as protein, calcium, iron, vitamin A, thiamine, riboflavin, niacin, ascorbic acid, or the like, contained in specific food articles, namely, the ingredients other than carbohydrates and fats. The cards may also contain information on the number of calories present in unit values of such foods.

As shown in Figure 2, the hinged back cover 14 is provided with a horizontal bottom wall element 21, said bottom wall element frictionally engaging over the horizontal bottom flange 21' or member 19 and defining a support for the data cards above described.

The bottom edge of the cover 14 is frictionally engageable beneath a horizontal flange 18' formed on the edge of the bottom wall 18, as shown in Figure 2.

The front wall 13 is formed at its upper portion with a plurality of horizontally extending slots 22 defining the horizontal calibrated bar elements 23 therebetween, said calibrated bar elements being generally trapezoidal in transverse cross sectional shape, as shown in Figure 2, and being inscribed on their front faces 24 with respective numerical scales of the quantitative values of the respective ingredients contained in unit quantities of specific foods. Thus, the front faces 24 of the horizontally extending bar elements 23 may be respectively inscribed with numerical scales associated with protein, calcium, iron, vitamin A, thiamine, riboflavin, niacin, and ascorbic acid, as shown in Figure 1, namely, the various ingredients in food articles other than carbohydrates and fats.

The front wall 13 is further formed with the respective horizontally extending rear bar elements 25 located between the scale bar elements 23 and spaced rearwardly therefrom, as shown in Figure 2. Slidably mounted in the respective slots 22 are respective index elements 26, said index elements having the upwardly tapering pointer portions 27 which are slidably disposed against the inclined lower forward surfaces 24 of the respective horizontal bar members 23, as shown in Figure 4. The index elements are formed with hooked lower flanges 29 which are slidably engaged around the top wall portions 30 of the subjacent horizontal bar elements 23, as shown in Figure 4, the inner vertical wall surfaces 31 of the index arms being slidably engaged against the inner bar elements 25, whereby the index members 26 are positively supported for horizontal sliding movement. Each index element 26 is formed with the upper lug element 33 which projects forwardly, as shown in Figure 4, and which is yieldably engageable in detent recesses 34 formed in the rearwardly facing lower shoulder elements 35 of the upwardly adjacent horizontal bar elements 23, as is clearly shown in Figures 4 and 5. The recesses 34 are spaced by the same distances as the calibrations on the sloping lower forward surfaces 24 of the bar members 23, so that the index members 26 may be yieldably held in positions adjacent the respective calibrations.

The front wall 13 is formed at its top portion with an additional slot 36 which is substantially greater in length than the previously described slots 22, but which is otherwise similarly provided with a downwardly and inwardly inclined horizontally extending wall surface 37 inscribed with a calorie scale, as shown in Figure 1. An index element 38 is slidably mounted in the slot 36 in the same manner as the previously described index elements 26, the index element 38 being provided with a detent lug which is engageable with detent recesses to yieldably hold the index element 38 at points adjacent the respective calibrations on the calorie scale.

The front wall 13 is formed with a vertical slot 39 in which is received the generally oblong shank 40 of a rivet member 41, said rivet member having the generally circular outer head 42 and the generally circular inner head 43 which is fastened to the end of the shank 40 in any suitable manner, as by a stud element 43' on the inner head 43 which is threadedly engaged axially in the end portion of the shank 40. Shank 40 interfits with the vertical slot 39 so that the rivet 41 is non-rotatable relative to the front wall 13. Rotatably mounted on the oblong shank 40 between the front wall 13 and inner head 43 are a plurality of disc members, for example, four disc members 44, 45, 46 and 47, of gradually increasing diameter, whereby the peripheral portion of the rearwardly adjacent disc member is exposed at the periphery of each disc member 44, 45 and 46. The peripheral portions of the respective disc members 44 to 47 are inscribed with respective numerical scales from zero to nine, as is clearly shown in Figures 6 and 8. Each disc member is formed inwardly of its numerical scale and adjacent its central aperture with the spaced series of detent recesses 50 which are angularly spaced in the same manner as the numerals of the associated scale.

Interposed between the front wall 13 and the smallest disc member 44 and non-rotatably engaged on the shank 40 is a friction washer 51. As shown in Figure 8, the friction washer is formed with the oblong aperture 52 in which the shank 40 is received. Similar friction washers are interposed between the disc member 44 and disc member 45, disc member 45 and disc member 46, and disc member 46 and disc member 47. The respective friction washers 51 are formed with detent lug elements 52 which are yieldably engageable in the detent recesses 50 of the adjacent disc members, as shown in Figure 9.

The front wall 13 is formed below the outer head portion 42 of rivet 41 with the concentric spaced slots 53 to 56, said slots 53 to 56 being of equal angular length and being located adjacent and being concentric with the lower peripheral portions of the respective disc members 44 to 47. Respective pin elements 57, 58, 59 and 60 are rigidly secured to the lower peripheral portions of said disc members and project outwardly through the respective slots 53 to 56, providing means for manually adjusting the respective disc members.

Front wall 13 is formed above the external head portion 42 of rivet 41 and diametrically opposite the center portions of the slots 53 to 56 with the radial window 61 through which the respective numerical scales on the disc members 44 to 47 are exposed, whereby the numbers of said scales may be radially aligned in the manner illustrated in Figures 1 and 6, to provide a total result from the addition of a number of food ingredient values in a manner presently to be described.

Thus, in using the device, the individual may determine the various amounts of the different food ingredients contained in a given food article under consideration, and may set the index elements 26 to corresponding points on the scales carried by the surfaces 24 associated with the respective index elements. The values are supplied from the data cards carried in the back cover 14, said cards being consulted, as required. Having established the values of the various ingredients, the total of all of said values may be determined by employing the concentrically arranged number discs 44 to 47. The various numerical values given by the index elements 26 may be successively added, one after the other, using the discs 44 to 47 to ascertain the successive totals, starting with the innermost disc 44, the discs being rotated by means of their associated operating pins 57 to 60. After the last tabulation, the total value of the food ingredients will appear in the window 61, as illustrated in Figure 1.

Since the slots 53 to 56 are centered below the radial window 61, the pins 57 to 60 are grouped in a readily accessible and mutually non-obstructing arrangement so that they may be easily moved along their arcuate guide slots to positions therealong corresponding to the desired number to be exhibited in the radial window 61. Since the window 61 is centered above the arcuate slots 53 to 56, said window has maximum visibility at all times. Thus, the desired numbers may be exhibited while holding the device upright and actuating the individual pins 57 to 60 successively, the radial window 61 being visible at all times during this process and remaining vertical.

Furthermore, it is never necessary to rotate any of the disc members 44 to 47 through an angle greater than that subtended by the arcuate slots 53 to 56, thereby making the device relatively easy to operate.

The total calorie content of the various foods consumed in a given meal or in a given set of other circumstances can be similarly tabulated by setting up the various calorie quantities successively, using the index member 38 and the calibrated calorie scale 37, and successively adding the calorie quantities, using the tabulator discs 44 to 47 in the same manner as above described in connection with the protein, mineral, and vitamin ingredients. The calorific values of various food items will, of course, be listed on the data cards carried in the cover compartment 20.

While a specific embodiment of a diet tabulator has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a tabulator of the character described, a housing provided with a front wall, said front wall being formed with a slot, a rivet member engaged through said slot, said rivet member having enlarged opposite end portions and a shank member connecting said end portions, said shank member being substantially oblong in cross section and fitting non-rotatably in said slot, a plurality of disc members engaged on said shank member inwardly of said front wall, said disc members increasing in diameter inwardly from said front wall, whereby the peripheral portions of the successive disc members are exposed forwardly, said disc members being provided with respective scales of uniformly angularly spaced digit numerals from zero to nine at their peripheral portions, said front wall being formed with a window extending radially from said slot through which the digit numerals of said scales are exposed, said disc members being formed with circular central apertures receiving said shank member, whereby the disc members are rotatable on said shank member, respective friction washers mounted on the shank member between the adjacent disc members, said washers being similar in size and having oblong central apertures non-rotatively receiving said shank member, said front wall being formed with respective arcuate slots of equal angular length adjacent the peripheral portions of the disc members, the central portions of the arcuate slots being located diametrically opposite the radially extending window, respective actuating pins on the peripheral portions of the disc members and projecting through said last-named slots, said disc members being formed inwardly of their scales and adjacent their central apertures with circularly arranged rows of locking recesses spaced by the same angles as said digit numerals, and detent lugs on the respective washers adjacent the central apertures of said disc members yieldably engageable in said recesses.

References Cited in the file of this patent

UNITED STATES PATENTS

| 780,853 | Anderson | Jan. 24, 1905 |
| 857,590 | Branch | June 25, 1907 |
| 1,659,748 | Sargent | Feb. 21, 1928 |
| 1,883,037 | Snook | Oct. 18, 1932 |
| 2,338,703 | Chapman | Jan. 11, 1944 |
| 2,433,984 | De Vries | Jan. 6, 1948 |
| 2,462,338 | Sieradzki | Feb. 22, 1949 |
| 2,912,776 | Koerber | Nov. 17, 1959 |

FOREIGN PATENTS

| 15,604 | Norway | Dec. 20, 1905 |